(12) United States Patent
Liu (10) Patent No.: US 10,929,198 B2
(45) Date of Patent: Feb. 23, 2021

(54) BLOCKCHAIN-BASED RESOURCE ALLOCATION METHOD AND APPARATUS

(71) Applicant: Advanced New Technologies Co., Ltd., Grand Cayman (KY)

(72) Inventor: Lindong Liu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/787,288

(22) Filed: Feb. 11, 2020

(65) Prior Publication Data
US 2020/0183757 A1     Jun. 11, 2020

(30) Foreign Application Priority Data
Mar. 29, 2019 (CN) .......................... 201910248877.5

(51) Int. Cl.
| G06F 16/00 | (2019.01) |
| G06F 9/50 | (2006.01) |
| G06F 16/27 | (2019.01) |
| G06F 16/23 | (2019.01) |
| G06Q 10/10 | (2012.01) |
| G06Q 20/06 | (2012.01) |

(52) U.S. Cl.
CPC ........ *G06F 9/5083* (2013.01); *G06F 16/2379* (2019.01); *G06F 16/27* (2019.01); *G06Q 10/10* (2013.01); *G06Q 20/065* (2013.01)

(58) Field of Classification Search
CPC .............................. G06F 16/27; G06F 16/2379
USPC ......................................................... 707/703
See application file for complete search history.

(56) References Cited

U.S. PATENT DOCUMENTS

| 2017/0214699 A1* | 7/2017 | Johnsrud ............... H04L 9/3239 |
| 2017/0243177 A1* | 8/2017 | Johnsrud ............... G06Q 20/10 |
| 2017/0330159 A1* | 11/2017 | Castinado ............. G06Q 20/02 |

(Continued)

FOREIGN PATENT DOCUMENTS

| CN | 108805707 | 11/2018 |
| CN | 108985940 | 12/2018 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Chelcie L Daye
(74) *Attorney, Agent, or Firm* — Fish & Richardson P.C.

(57) ABSTRACT

Implementations of the present application provide a blockchain-based resource allocation method. A target transaction is obtained, by a first node device in a blockchain network, from a distributed database of the blockchain network. The blockchain network comprises a target user device of a target user and the first node device. The target transaction comprises service behavior data of the target user, and the service behavior data of the target user is generated by the target user device by using a target service. A smart contract corresponding to an allocation of a resource is invoked comprising: executing a resource allocation logic that is stored in the smart contract and that is related to the service behavior data of the target user, and performing the allocation of the resource to the target user.

20 Claims, 3 Drawing Sheets

(56) References Cited

U.S. PATENT DOCUMENTS

| | | | |
|---|---|---|---|
| 2018/0218176 A1 | 8/2018 | Voorhees et al. | |
| 2019/0018863 A1 | 1/2019 | Wu | |
| 2019/0058592 A1 | 2/2019 | Wright | |
| 2019/0058709 A1 | 2/2019 | Kempf et al. | |
| 2019/0132350 A1* | 5/2019 | Smith | H04L 41/22 |

FOREIGN PATENT DOCUMENTS

| | | |
|---|---|---|
| CN | 109191289 | 1/2019 |
| CN | 109496407 | 3/2019 |
| CN | 109510713 | 3/2019 |
| CN | 109523347 | 3/2019 |
| JP | 2019-29019 | 2/2019 |
| TW | 201732666 | 9/2017 |
| TW | 201835835 | 10/2018 |
| TW | 201842476 | 12/2018 |
| WO | WO 2018165472 | 9/2018 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Application No. PCT/US2020/016024, dated May 3, 2020, 12 pages.

* cited by examiner

```
┌─────────────────────────────────────────────────────────────────────┐
│ A first node device obtains a target transaction from a distributed │
│ database of a blockchain, where the target transaction includes     │─ 102
│ service behavior data of a target user, and the service behavior    │
│ data of the target user is generated by a target user               │
│ client by using a target service                                    │
└─────────────────────────────────────────────────────────────────────┘
                                   │
                                   ▼
┌─────────────────────────────────────────────────────────────────────┐
│ Invoke a smart contract corresponding to resource allocation, and   │
│ execute resource allocation logic that is declared in the smart     │─ 104
│ contract and that is related to the service behavior data of the    │
│ target user, to transfer a resource to the target user              │
└─────────────────────────────────────────────────────────────────────┘
```

BLOCKCHAIN-BASED RESOURCE ALLOCATION METHOD AND APPARATUS

CROSS-REFERENCE TO RELATED APPLICATIONS

This application claims priority to Chinese Patent Application No. 201910248877.5, filed on Mar. 29, 2019, which is hereby incorporated by reference in its entirety.

TECHNICAL FIELD

The present specification relates to the field of network communications and data processing technologies, and in particular, to a blockchain-based resource allocation method and apparatus.

BACKGROUND

The blockchain technology is also referred to as a distributed ledger technology, and is an emerging technology in which several computing devices jointly participate in "accounting" and jointly maintain a completed distributed database. Blockchain technology has been widely used in many fields due to its decentralized, open, and transparent features, and each computing device can participate in database recording and quickly perform data synchronization.

SUMMARY

In view of this, one or more implementations of the present specification provide a blockchain-based resource allocation method, applied to a blockchain network that includes a target user client and a first node device. The method includes: obtaining, by the first node device, a target transaction from a distributed database of a blockchain, where the target transaction includes service behavior data of a target user, and the service behavior data of the target user is generated by the target user client by using a target service; and invoking a smart contract corresponding to resource allocation, and executing resource allocation logic that is declared in the smart contract and that is related to the service behavior data of the target user, to transfer a resource to the target user.

In a shown implementation, the resource includes a digital asset on the blockchain or a value corresponding to a resource off the blockchain.

In another shown implementation, the service behavior data of the target user includes activeness data of the target user about using the target service, or evaluation data generated for the target user about using the target service.

In another shown implementation, the executing resource allocation logic that is declared in the smart contract and that is related to the service behavior data of the target user, to transfer a resource to the target user includes: determining whether the service behavior data of the target user reaches a predetermined threshold; and in response to determining that the service behavior data of the target user reaches the predetermined threshold, transferring an amount of resources corresponding to the service behavior data to the target user by using the smart contract.

In another shown implementation, the blockchain is a consortium chain, and the first node device includes a consortium member node device that provides the target service.

Correspondingly, the present specification further provides a blockchain-based resource allocation apparatus, applied to a blockchain network that includes a target user client and a first node device. The apparatus is applied to the first node device and includes: an acquisition unit, configured to obtain a target transaction from a distributed database of a blockchain, where the target transaction includes service behavior data of a target user, and the service behavior data of the target user is generated by the target user client by using a target service; and an execution unit, configured to invoke a smart contract corresponding to resource allocation, and execute resource allocation logic that is declared in the smart contract and that is related to the service behavior data of the target user, to transfer a resource to the target user.

In a shown implementation, the resource includes a digital asset on the blockchain or a value corresponding to a resource off the blockchain.

In another shown implementation, the service behavior data of the target user includes activeness data of the target user about using the target service, or evaluation data generated for the target user about using the target service.

In another shown implementation, the execution unit is further configured to: determine whether the service behavior data of the target user reaches a predetermined threshold; and in response to determining that the service behavior data of the target user reaches the predetermined threshold, transfer an amount of resources corresponding to the service behavior data to the target user by using the smart contract.

In another shown implementation, the blockchain is a consortium chain, and the first node device includes a consortium member node device that provides the target service.

The present specification further provides a computer device, including a storage and a processor. The storage stores a computer program that can be run by a processor, and when running the computer program, the processor executes the steps in the previously described blockchain-based resource allocation method.

The present specification further provides a computer-readable storage medium. The computer-readable storage medium stores a computer program, and when the computer program is run by a processor, the steps in the previously described blockchain-based resource allocation method are executed.

According to the blockchain-based resource allocation method provided in the present specification, based on the service behavior data of the target user generated by the target user client, the resource is transferred to the target user by using a smart contract deployed on the blockchain. Deployment and an invoke execution result of the smart contract are both verified by node devices consensus in the blockchain, thereby ensuring that the blockchain-based resource allocation method provided in the present specification can be efficiently executed. In addition, the service behavior data of the target user is also recorded in the distributed database of the blockchain. Based on a consensus mechanism and an anti-tamper mechanism of the blockchain, the service behavior data of the target user is difficult to be counterfeited or tampered with, thereby providing a real and effective data foundation for a resource transfer method that is based on the service behavior data of the target user.

DESCRIPTION OF IMPLEMENTATIONS

Example implementations are described in detail here, and examples of the implementations are presented in the accompanying drawings. When the following description relates to the accompanying drawings, unless specified otherwise, same numbers in different accompanying drawings represent same or similar elements. The implementations described in the following example implementations do not represent all implementations consistent with one or more implementations of the present specification. On the contrary, the implementations are only examples of an apparatus and a method that are described in the appended claims in detail and that are consistent with some aspects of the one or more implementations of the present specification.

It is worthwhile to note that, in other implementations, steps in a corresponding method are not necessarily executed in a sequence shown and described in the present specification. In some other implementations, the method can include more or fewer steps than those described in the present specification. In addition, a single step described in the present specification may be broken down into multiple steps for description in other implementations, and multiple steps described in the present specification may be combined into a single step for description in other implementations.

The one or more implementations provided in the present specification illustrate a blockchain-based resource allocation method, and the method is applied to a blockchain network that includes a target user client and a first node device.

The blockchain network described in the one or more implementations of the present specification can be specifically a P2P network system that has a distributed data storage structure and that is achieved by all node devices by using a consensus mechanism. Data in a blockchain is distributed in "blocks (block)" that are connected in terms of time, a current block includes a data digest of a previous block, and full data backup of all or some of the nodes is achieved based on a specific consensus mechanism (such as POW, POS, DPOS, or PBFT). A person skilled in the art knows that, because a blockchain network system runs in a corresponding consensus mechanism, data that has been recorded in a database of a blockchain is difficult to be tampered with by any node. For example, for a blockchain that uses a POW consensus, existing data may only be tampered with by using an attack of at least 51% of computing power of the entire network. Therefore, the blockchain system can ensure data security due to an anti-attack and anti-tamper feature that are unmatched by other centralized database systems. Therefore, it can be learned that data recorded in the distributed database of the blockchain cannot be attacked or tampered with, thereby ensuring authenticity and reliability of data information stored in the distributed database of the blockchain.

Example types of the blockchain network can include a public blockchain network, a private blockchain network, and a consortium blockchain network. The public blockchain network is open to all entities that use a P2P network and participate in a consensus process. The private blockchain network is provided for a specific entity, and the specific entity centrally controls read and write permissions. The consortium blockchain network is provided for a selected entity group (the selected entity group controls a consensus process) and includes an access control layer. The implementations of the present specification can be implemented in any proper type of blockchain network.

The resource described in the one or more implementations of the present specification can include a digital asset on the blockchain or an asset value corresponding to an asset off the blockchain. For example, the resource can correspond to not only a smart asset such as a token (token) or a digital asset in the blockchain, but also an off-chain asset such as cash, security, coupon, or real estate off the blockchain, and can even include a characteristic value such as a digital asset or points circulated in a user digital community. Implementations are not limited in the present specification.

The node device described in the one or more implementations of the present specification is a node device that can join the blockchain by following a corresponding node protocol and running installation of a node protocol program. A person skilled in the art usually refers to a node device with full backup of data in the distributed database of the blockchain as a full node, and refers to a node device with partial backup of the data in the distributed database of the blockchain (for example, with only data in a block header) as a light node.

In one or more implementations of the present specification, a target user joins the blockchain network by running a client installation program on a terminal. The client installation program can be a node device installation program, and correspondingly, the target user client also serves as a node device in the blockchain. Alternatively, the client installation program can be a blockchain user client program that is connected to the previously described selected entity node device (consortium member node device) in the consortium chain and whose access is controlled, and correspondingly, the target user client has no permission to directly access the distributed database of the blockchain, and therefore usually does not serve as a node device (or a node) in the blockchain.

Therefore, it can be learned that the blockchain-based resource allocation method provided in the present specification is applicable to any type of blockchain network, such as a public chain, a private chain, or a consortium chain.

To further provide a background of the implementations of the present specification, an application program can be developed, tested, and deployed in the blockchain network to be executed in the blockchain network. An example application program can include but is not limited to a smart contract. The smart contract can be described as a numeric representation of a real world legal contract with contractual terms that affect all parties. The smart contract is implemented, stored, updated (as required), and executed in the blockchain network. Contract parties (for example, a buyer and a seller) associated with the smart contract are represented as nodes in the blockchain network.

In some examples, the smart contract can store data, and the data can be used to record information, a fact, an association, a balance, and any other information required for implementing contract execution logic. The smart contract can be described as a computer-executable program composed of functions. Instances (instance) of the smart contract can be created, and the functions can be invoked to execute logic of the smart contract.

In terms of technology, the smart contract can be implemented based on an object and an object-oriented class. For example, terms and components of the smart contract can be represented as objects processed by an application program that implements the smart contract. The smart contract (or an object in the smart contract) can invoke another smart contract (or an object in the same smart contract) just like an object in object-oriented programming. For example, invocation performed by the object can be invocation of creation, update, deletion, propagation, or communication with an object of another class. Invocation between objects can be implemented by using a function, a method, an application programming interface (API), or other invocation mechanisms. For example, a first object can invoke a function to create a second object.

In view of the previous background, the implementations of the present specification are further described in detail here. More specifically, as described above, the implementations of the present specification relate to transferring a resource to a target user by using a smart contract.

Figure 1:
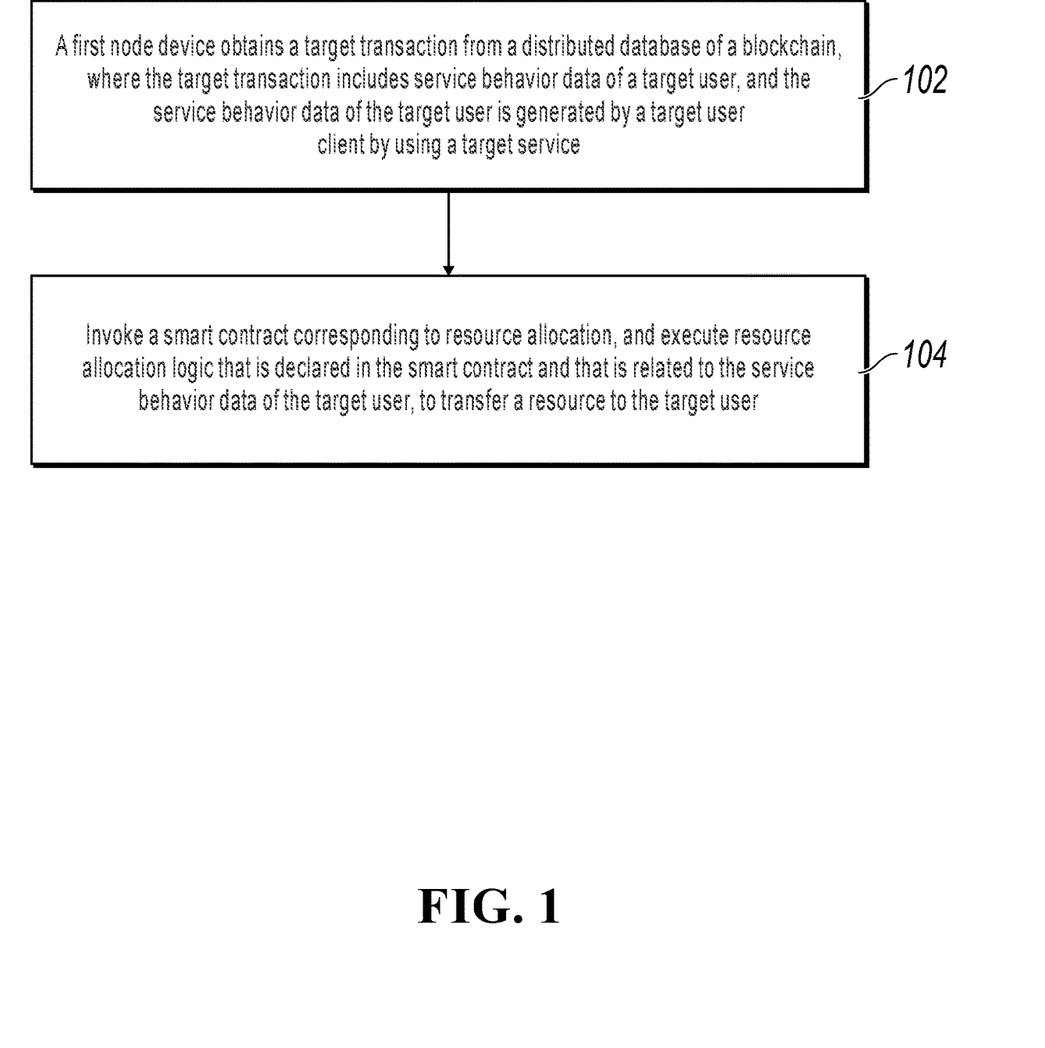
FIG. 1 is a flowchart illustrating a blockchain-based resource allocation method, according to an example implementation of the present specification.

As shown in FIG. 1, the blockchain-based resource allocation method in the one or more implementations provided in the present specification includes the following steps.

Step 102: A first node device obtains a target transaction from a distributed database of a blockchain, where the target transaction includes service behavior data of a target user, and the service behavior data of the target user is generated by a target user client.

The first node device can be any node device that can invoke and run a smart contract corresponding to resource allocation in the blockchain. When the resource allocation method provided in the present specification is applied to a consortium chain, the first node device can include a consortium member node device that provides a target service for the target user client.

The transaction described in the present specification is data that is created by a node device in the blockchain and that ultimately needs to be published to the distributed database of the blockchain. The transaction in the blockchain includes a transaction in a narrow sense and a transaction in a broad sense. The transaction in a narrow sense is a value transfer published by a user to the blockchain. For example, in a conventional bitcoin blockchain network, a transaction can be a transfer initiated by a user in the blockchain. The transaction in a broad sense is service data that is published by a user to the blockchain for a service purpose by using a node device. For example, the target transaction described in this implementation includes the service behavior data of the target user generated based on use of the target service provided by the target user for the blockchain network or the target service provided by a node device in the blockchain. For example, an order record of a user reflects activeness data of the target user about using the target service, or evaluation data generated for the target user about using the target service.

Correspondingly, in this implementation, a transmitter that sends the target transaction to the distributed database of the blockchain is not limited, and the target transaction can be sent by a node device that provides the target service. When the target user client serves as a node device in the blockchain, the target transaction can be sent by the target user client.

Step 104: Invoke a smart contract corresponding to resource allocation, and execute resource allocation logic that is declared in the smart contract and that is related to the service behavior data of the target user, to transfer a resource to the target user.

Through consensus and verification performed by node devices in the blockchain, the smart contract corresponding to resource allocation can be deployed on the blockchain. The resource allocation logic related to the service behavior data of the target user in this implementation can include a rule of allocating the resource to the target user based on the service behavior data of the target user. For example, each time the target user completes predetermined service behavior, the target user should obtain a corresponding resource award. Alternatively, a threshold is predetermined for service behavior of the target user, so that each time the target user completes the service behavior with the predetermined threshold, the target user should obtain a corresponding resource award. Alternatively, weights can be separately set for different types of service behavior completed by the target user, and whether the target user completes the service behavior with the predetermined threshold is counted based on a type and an amount of service behavior completed by the target user. Implementations are not limited in the present specification. A person skilled in the art can design, based on a specific service scenario, a resource allocation logic rule that satisfies ecological development of the target service, to allocate a resource that matches a contribution of the target user to the target user that contributes to the ecological development of the target service, to encourage the target user.

In a shown implementation, the consensus on the smart contract can include a consensus on the resource allocation logic rule declared in the smart contract, so that it can be ensured that the resource allocation logic is verified by multiple parties. In addition, a person skilled in the art should know that an invoke execution result of the smart contract also needs to be verified by the node devices in the blockchain by consensus. Only in this way, the invoke execution result can be recorded in the distributed database of the blockchain. Therefore, the resource allocation method provided in the one or more implementations of the present specification has relatively obvious fairness compared with a solution that a centralized service provider formulates and executes a rule.

Specifically, in a shown implementation, the executing resource allocation logic that is declared in the smart contract and that is related to the service behavior data of the target user, to transfer a resource to the target user includes: determining whether the service behavior data of the target user reaches a predetermined threshold; and in response to determining that the service behavior data of the target user reaches the predetermined threshold, transferring an amount of resources corresponding to the service behavior data to the target user by using the smart contract.

The transferring an amount of resources corresponding to the service behavior data to the target user in this implementation includes transferring, by using the smart contract corresponding to resource allocation, the amount of resources corresponding to the service behavior data of the target user to an address or an account of the target user. As described above, the resource in this implementation can include a digital asset on the blockchain, for example, a digital token (Token) that is circulated on the blockchain and that is set according to a protocol of the blockchain, or can include a value corresponding to a resource off the blockchain, for example, a value corresponding to off-chain cash, housing estate, precious metal, or even virtual resource circulated in a digital community.

In a shown implementation, when the resource is the digital token (Token) that is circulated on the blockchain and that is set according to the protocol of the blockchain, the transferring a resource to the target user includes transferring an amount of resources corresponding to the service behavior data of the target user to the target user. In addition to recording the target transaction used to invoke the smart contract for transfer in the distributed database of the blockchain, the transferred resource can also be directly reflected in an increase in a token balance of a blockchain account of the target user, similar to a user account setting of an Ethereum blockchain.

In another shown implementation, when the resource is the value corresponding to the specified resource off the blockchain, for the blockchain, content used to represent an amount of the specified resource off the blockchain can be set in content of a blockchain account of the user, to generate, on the blockchain by using a method similar to the token transfer method, a transfer of the value corresponding to the specified resource off the blockchain, that is, an increase in a specified resource balance included in the blockchain account of the target user. Alternatively, a resource transfer transaction is sent to the distributed database of the blockchain by using the smart contract, where the resource transfer transaction is transferring a specified resource of a value corresponding to the service behavior data of the target user to the target user, to provide a credential for transfer of the specified resource off the blockchain.

The smart contract used for resource allocation can generate a resource benefit based on use of a user. For example, by using a pay service or a paid service, a target service provider can obtain a resource benefit. The resource benefit can be directly received in an account of the smart contract corresponding to resource allocation, or can be indirectly transferred to the account of the smart contract corresponding to resource allocation by using a resource transfer method. As described in the one or more implementations, the resource is transferred to the target user by invoking the smart contract, and the smart contract can be invoked at any time based on service use behavior of the target user, which saves time costs and labor costs of offline communication, achieves fairness, improves resource transfer efficiency, and effectively encourages a user to increase an individual resource benefit by improving service activeness or a positive evaluation rate of the user.

Figure 3:
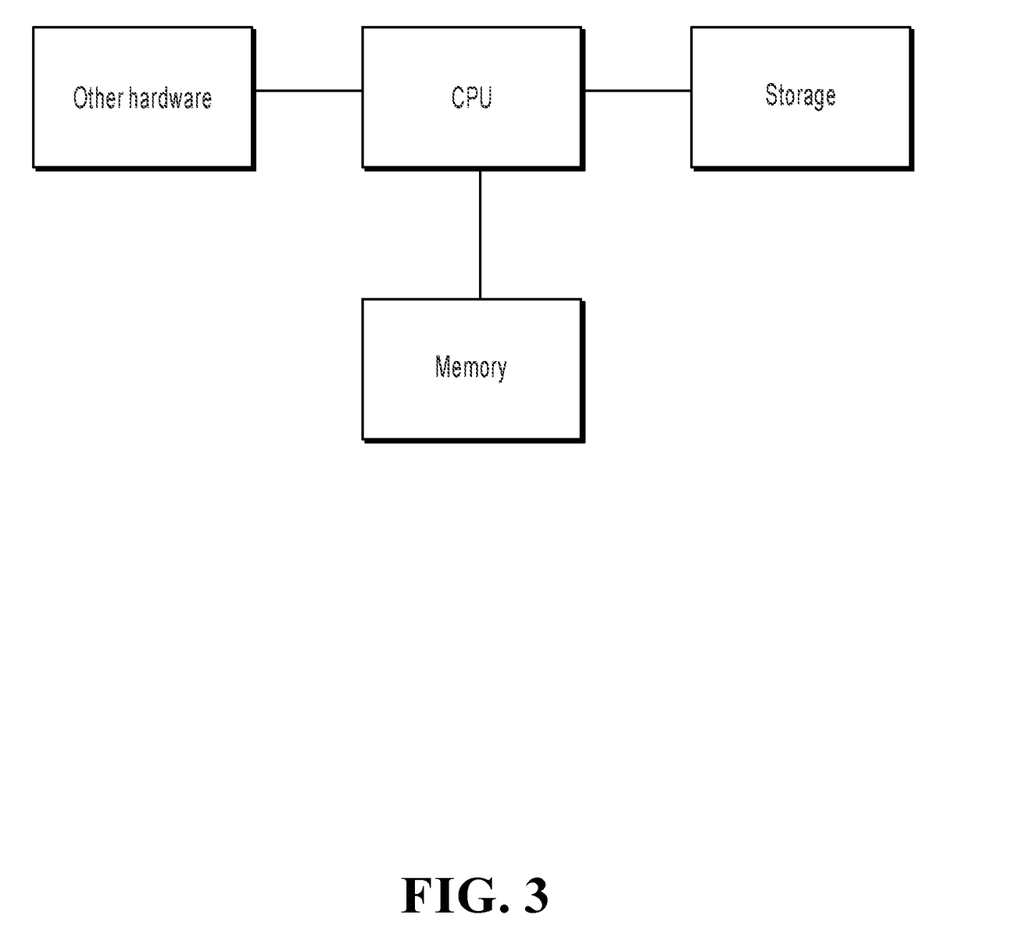
FIG. 3 is a hardware structural diagram illustrating an implementation of running a blockchain-based resource allocation apparatus provided in the present specification.

Corresponding to process implementation of the previous blockchain-based resource allocation method, an implementation of the present specification further provides a blockchain-based resource allocation apparatus. The apparatus can be implemented by using software, hardware, or a combination of software and hardware. Software implementation is used as an example. As a logical apparatus, the apparatus is formed by reading a corresponding computer program instruction to a memory for running by a central processing unit (CPU) in a device that the apparatus is located in. In terms of hardware, in addition to a CPU, a memory, and a storage shown in FIG. 3, the device that the resource allocation apparatus is located in usually further includes other hardware such as a chip for sending/receiving a radio signal, and/or other hardware such as a card configured to implement a network communication function.

Figure 2:
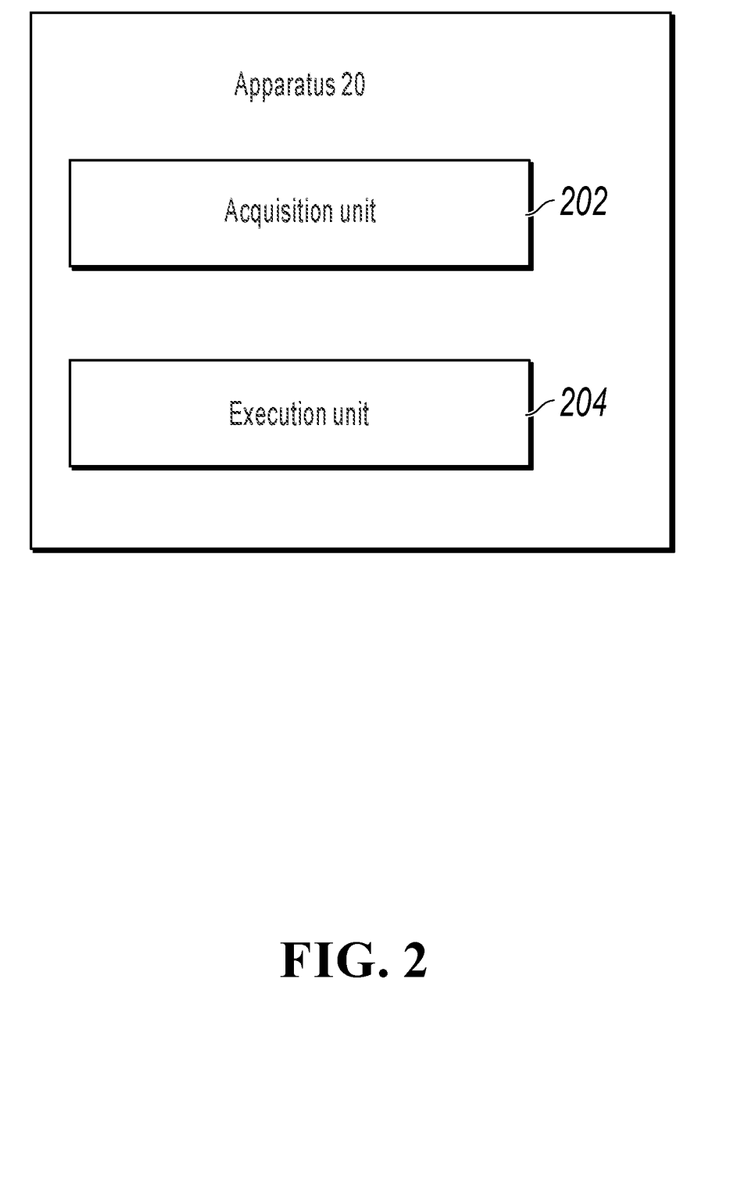
FIG. 2 is a schematic structural diagram illustrating a blockchain-based resource allocation apparatus, according to an example implementation of the present specification.

FIG. 2 shows a blockchain-based resource allocation apparatus 20 provided in the present specification, applied to a blockchain network that includes a target user client and a first node device. The apparatus 20 is applied to the first node device and includes: an acquisition unit 202, configured to obtain a target transaction from a distributed database of a blockchain, where the target transaction includes service behavior data of a target user, and the service behavior data of the target user is generated by the target user client by using a target service; and an execution unit 204, configured to invoke a smart contract corresponding to resource allocation, and execute resource allocation logic that is declared in the smart contract and that is related to the service behavior data of the target user, to transfer a resource to the target user.

In a shown implementation, the resource includes a digital asset on the blockchain or a value corresponding to a resource off the blockchain.

In another shown implementation, the service behavior data of the target user includes activeness data of the target user about using the target service, or evaluation data generated for the target user about using the target service.

In another shown implementation, the execution unit 204 is further configured to: determine whether the service behavior data of the target user reaches a predetermined threshold; and in response to determining that the service behavior data of the target user reaches the predetermined threshold, transfer an amount of resources corresponding to the service behavior data to the target user by using the smart contract.

In another shown implementation, the blockchain is a consortium chain, and the first node device includes a consortium member node device that provides the target service.

For a specific implementation process of a function of each unit in the apparatus 20, references can be made to an implementation process of a corresponding step in the previous method. For related parts, references can be made to partial descriptions in the method implementation. Details are omitted here.

The previously described apparatus implementation is merely an example. The units described as separate parts may or may not be physically separate, and parts displayed as units may or may not be physical modules, that is, may be located in one position, or may be distributed on a plurality of network modules. Some or all of the units or modules can be selected based on actual demands to achieve the objectives of the solutions of the present specification. A person of ordinary skill in the art can understand and implement the implementations of the present application without creative efforts.

The apparatus, units, or modules described in the previous implementations can be specifically implemented by a computer chip or an entity, or can be implemented by a product with a certain function. A typical implementation device is a computer, and the computer can be specifically a personal computer, a laptop computer, a cellular phone, a camera phone, a smartphone, a personal digital assistant, a media player, a navigation device, an email sending/receiving device, a game console, a tablet computer, a wearable device, or any combination of these devices.

Corresponding to the previous blockchain transaction method implementation, an implementation of the present specification further provides a computer device. The computer device includes a storage and a processor. The storage stores a computer program that can be run by the processor, and when running the stored computer program, the processor executes the steps in the blockchain-based resource allocation method that are executed by the node device in the blockchain in the implementations of the present specification. For detailed descriptions of the steps in the blockchain-based resource allocation method that are executed by the node device in the blockchain, references can be made to the previous content. Details are omitted.

Corresponding to the previous blockchain-based resource allocation method implementation, an implementation of the present specification further provides a computer-readable storage medium. The computer-readable storage medium stores a computer program, and when the computer program is run by a processor, the steps in the blockchain-based resource allocation method that are executed by the node device in the blockchain in the implementations of the present specification are executed. For detailed descriptions of the steps in the blockchain-based resource allocation method that are executed by the node device in the blockchain, references can be made to the previous content. Details are omitted.

The previous descriptions are merely example implementations of the present specification, but are not intended to limit the present specification. Any modification, equivalent replacement, improvement, etc. made without departing from the spirit and principle of the present specification shall fall within the protection scope of the present specification.

In a typical configuration, a computing device includes one or more processors (CPUs), an input/output interface, a network interface, and a memory.

The memory may include a non-persistent memory, a random access memory (RAM), a nonvolatile memory, and/or another form in a computer-readable medium, for example, a read-only memory (ROM) or a flash memory (flash RAM). The memory is an example of the computer-readable medium.

The computer-readable medium includes persistent, non-persistent, movable, and unmovable media that can store information by using any method or technology. The information can be a computer-readable instruction, a data structure, a program module, or other data.

Examples of a computer storage medium include but are not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage or another magnetic storage device, or any other non-transmission media. The computer storage medium can be configured to store information accessible to the computing device. Based on the definition in the present specification, the computer-readable medium does not include computer-readable transitory media (transitory media) such as a modulated data signal and carrier.

It is worthwhile to further note that, the terms "comprise", "include", or their any other variants are intended to cover a non-exclusive inclusion, so that a process, method, product, or device that includes a series of elements not only includes those elements but also includes other elements that are not expressly listed, or further includes elements inherent to such process, method, product, or device. Without more constraints, an element preceded by "includes a . . . " does not preclude the existence of additional identical elements in the process, method, product, or device that includes the element.

A person skilled in the art should understand that the implementations of the present specification can be provided as a method, a system, or a computer program product. Therefore, the implementations of the present specification can use a form of hardware only implementations, software only implementations, or implementations with a combination of software and hardware. Moreover, the implementations of the present specification can use a form of a computer program product that is implemented on one or more computer-usable storage media (including but not limited to a disk memory, a CD-ROM, an optical memory, etc.) that include computer-usable program code.

What is claimed is:

1. A computer-implemented method, comprising:
   obtaining, by a first node device in a blockchain network, a target transaction from a distributed database of the blockchain network, wherein the blockchain network comprises a target user device of a target user and the first node device, wherein the target transaction comprises service behavior data of the target user, and the service behavior data of the target user is generated by the target user device associated with a target service;
   determining, by the first node device and based on various attributes including a type and an amount of the service behavior data, that a performance of the service behavior data satisfies a predetermined threshold; and
   upon determining that the performance of the service behavior data satisfies the predetermined threshold, invoking, by the first node device, a smart contract corresponding to an allocation of a resource, comprising:
      executing, by the first node device, a resource allocation logic that is stored in the smart contract and that is related to the service behavior data of the target user, and
      performing, by the first node device, the allocation of the resource to the target user.

2. The computer-implemented method of claim 1, wherein the resource comprises a digital asset on the blockchain network or a value corresponding to a resource off the blockchain network.

3. The computer-implemented method of claim 1, wherein the service behavior data of the target user comprises activeness data of the target user associated with the target service, or evaluation data generated for the target user associated with the target service.

4. The computer-implemented method of claim 1, wherein executing the resource allocation logic that is stored in the smart contract and that is related to the service behavior data of the target user, and performing the allocation of the resource to the target user comprises:
   in response to determining that the service behavior data of the target user reaches the predetermined threshold, performing, by the first node device, transferring of an amount of the resource corresponding to the service behavior data to the target user according to the smart contract.

5. The computer-implemented method of claim 1, wherein the blockchain network is a consortium chain network, and the first node device comprises a consortium member node device that provides the target service.

6. The computer-implemented method of claim 1, wherein the smart contract is implemented in the blockchain network, and wherein one or more contract parties associated with the smart contract are represented as one or more nodes in the blockchain network.

7. The computer-implemented method of claim 1, wherein the service behavior data is published to the distributed database of the blockchain network.

8. A non-transitory, computer-readable medium storing one or more instructions executable by a computer system to perform operations comprising:

obtaining, by a first node device in a blockchain network, a target transaction from a distributed database of the blockchain network, wherein the blockchain network comprises a target user device of a target user and the first node device, wherein the target transaction comprises service behavior data of the target user, and the service behavior data of the target user is generated by the target user device associated with a target service;

determining, by the first node device and based on various attributes including a type and an amount of the service behavior data, that a performance of the service behavior data satisfies a predetermined threshold; and upon determining that the performance of the service behavior data satisfies the predetermined threshold, invoking, by the first node device, a smart contract corresponding to an allocation of a resource, comprising:

executing, by the first node device, a resource allocation logic that is stored in the smart contract and that is related to the service behavior data of the target user, and performing, by the first node device, the allocation of the resource to the target user.

9. The non-transitory, computer-readable medium of claim 8, wherein the resource comprises a digital asset on the blockchain network or a value corresponding to a resource off the blockchain network.

10. The non-transitory, computer-readable medium of claim 8, wherein the service behavior data of the target user comprises activeness data of the target user associated with the target service, or evaluation data generated for the target user associated with the target service.

11. The non-transitory, computer-readable medium of claim 8, wherein executing the resource allocation logic that is stored in the smart contract and that is related to the service behavior data of the target user, and performing the allocation of the resource to the target user comprises:

in response to determining that the service behavior data of the target user reaches the predetermined threshold, performing, by the first node device, transferring of an amount of the resource corresponding to the service behavior data to the target user according to the smart contract.

12. The non-transitory, computer-readable medium of claim 8, wherein the blockchain network is a consortium chain network, and the first node device comprises a consortium member node device that provides the target service.

13. The non-transitory, computer-readable medium of claim 8, wherein the smart contract is implemented in the blockchain network, and wherein one or more contract parties associated with the smart contract are represented as one or more nodes in the blockchain network.

14. The non-transitory, computer-readable medium of claim 8, wherein the service behavior data is published to the distributed database of the blockchain network.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:

obtaining, by a first node device in a blockchain network, a target transaction from a distributed database of the blockchain network, wherein the blockchain network comprises a target user device of a target user and the first node device, wherein the target transaction comprises service behavior data of the target user, and the service behavior data of the target user is generated by the target user device associated with a target service;

determining, by the first node device and based on various attributes including a type and an amount of the service behavior data, that a performance of the service behavior data satisfies a predetermined threshold; and upon determining that the performance of the service behavior data satisfies the predetermined threshold, invoking, by the first node device, a smart contract corresponding to an allocation of a resource, comprising:

executing, by the first node device, a resource allocation logic that is stored in the smart contract and that is related to the service behavior data of the target user, and performing, by the first node device, the allocation of the resource to the target user.

16. The computer-implemented system of claim 15, wherein the resource comprises a digital asset on the blockchain network or a value corresponding to a resource off the blockchain network.

17. The computer-implemented system of claim 15, wherein the service behavior data of the target user comprises activeness data of the target user associated with the target service, or evaluation data generated for the target user associated with the target service.

18. The computer-implemented system of claim 15, wherein executing the resource allocation logic that is stored in the smart contract and that is related to the service behavior data of the target user, and performing the allocation of the resource to the target user comprises:

in response to determining that the service behavior data of the target user reaches the predetermined threshold, performing, by the first node device, transferring of an amount of the resource corresponding to the service behavior data to the target user according to the smart contract.

19. The computer-implemented system of claim 15, wherein the blockchain network is a consortium chain network, and the first node device comprises a consortium member node device that provides the target service.

20. The computer-implemented system of claim 15, wherein the smart contract is implemented in the blockchain network, and wherein one or more contract parties associated with the smart contract are represented as one or more nodes in the blockchain network.

* * * * *